United States Patent [19]

Baba et al.

[11] 4,350,802

[45] Sep. 21, 1982

[54] CATALYST SYSTEM FOR POLYMERIZATION OF OLEFINS AND PROCESS FOR PRODUCTION OF POLYOLEFINS USING THE CATALYST SYSTEM

[75] Inventors: Kazuo Baba; Kizuku Wakatsuki, both of Ichihara; Tadashi Hikasa, Chiba, all of Japan

[73] Assignee: Sumitomo Chemical Company, Limited, Osaka, Japan

[21] Appl. No.: 135,165

[22] Filed: Mar. 28, 1980

[30] Foreign Application Priority Data

Apr. 5, 1979 [JP] Japan .................................. 54/41658

[51] Int. Cl.$^3$ ........................... C08F 4/64; C08F 10/00
[52] U.S. Cl. ............................... 526/142; 252/429 B; 526/139; 526/140; 526/141; 526/351; 526/352
[58] Field of Search .................... 252/429 B; 526/125, 526/139, 140, 141, 142

[56] References Cited

U.S. PATENT DOCUMENTS

| | | | |
|---|---|---|---|
| 4,113,654 | 9/1978 | Ferrara et al. | 252/429 |
| 4,218,339 | 8/1980 | Zucchini et al. | 526/125 |
| 4,229,558 | 10/1980 | Kakogawa et al. | 526/125 |
| 4,232,139 | 11/1980 | Minami et al. | 526/125 |

FOREIGN PATENT DOCUMENTS

2724971 12/1977 Fed. Rep. of Germany ...... 526/125

OTHER PUBLICATIONS

M. Vallino, J. Organometal. Chem., 20, 1 (1969).

E. C. Ashby, W. E. Becker, J. Amer., Chem. Soc., 85, 118 (1963).
E. C. Ashby, ibid., 87, 2509 (1965).
L J. Guggenberger, R. E. Stucky, J. Amer. Chem. Soc., 90, 5375 (1968).
G. D. Stucky, R. E. Rundle, ibid., 86, 4825 (1964).

*Primary Examiner*—Edward J. Smith
*Attorney, Agent, or Firm*—Birch, Stewart, Kolasch & Birch

[57] ABSTRACT

A catalyst system useful for the polymerization of olefins which comprises
(A) at least one organometallic compound of a typical metal belonging to I, II and III group of Periodic table,
(B) a reaction production of (i) a solid organomagnesium compound of the formula: $MgR_lX_{2-1}\cdot\alpha D$ wherein R is a hydrocarbon group having 1 to 20 carbon atoms, X is a halogen atom, D is a Lewis base, l is a number in the range of $0 < l < 2$ and $\alpha$ is a number in the range of $0 \leq \alpha < 1.5$, (ii) a phenol compound, (iii) a Lewis base, and (iv) a titanium compound and/or vanadium compound, and optionally
(C) a Lewis base in an amount of up to 1 mole to 1 mole of the component (A), and a process for homo- or copolymerization of olefins by using the catalyst system. The catalyst system of the present invention shows excellent activities not only per the transition metal compound but also per the solid catalyst and can give polyolefins having a high stereoregularity.

8 Claims, No Drawings

CATALYST SYSTEM FOR POLYMERIZATION OF OLEFINS AND PROCESS FOR PRODUCTION OF POLYOLEFINS USING THE CATALYST SYSTEM

The present invention relates to an improvement of a catalyst system useful for the polymerization of olefins and a process for the homopolymerization or copolymerization of olefins using the catalyst system.

There have hitherto been proposed some improvements of the catalyst system useful for the polymerization of olefins in order to enhance the activity of the catalyst or to obtain polymers having a high stereoregularity. For instance, a reaction product of an organomagnesium compound and a transition metal compound is used as the catalyst (cf. Japanese Patent Publication (unexamined) No. 72,384/1974 and Japanese Patent Publication No. 495/1960), and a copulverized mixture of a metal alkoxide and a transition metal compound or a reaction product of these compounds is used as the catalyst (cf. Japanese Patent Publication (unexamined) Nos. 2,580/1978 and 119,982/1974 and Japanese Patent Publication No. 42,137/1972).

The present inventors have already provided an improved catalyst system obtained by the reaction of a solid organomagnesium compound and a transition metal compound, which shows excellent catalytic activities, i.e. not only a high activity per the transition metal compound but also a high activity per the solid catalyst component and can give a polymer having a high stereoregularity without necessity of removal of the catalyst residues (cf. Japanese Patent Application No. 11,157/1978, U.S. Ser. No. 7,844). The catalyst is prepared by reacting an organic halogen compound and magnesium metal in the presence of iodine in an inert hydrocarbon solvent which does substantially not dissolve an organomagnesium compound, activating the resulting organomagnesium compound particles with a Lewis base and then reacting the resulting solid compound with a transition metal compound. The catalyst thus obtained has a high catalytic activity per the transition metal compound and can give the desired polymer having a high stereoregularity. However, in case of the polymerization of olefins, this catalyst is still not satisfactory in the activity per the solid catalyst and also in the stereoregularity.

The present inventors have further intensively studied to obtain a further improved catalyst system which shows excellent catalytic activities not only per the transition metal compound but also per the solid catalyst and can give the desired polyolefins having a high stereoregularity. As a result, it has now been found that the desired catalyst system suitable for the production of polyolefins can be obtained by using a reaction product of a phenol compound and an organomagnesium compound powder which is obtained by the reaction of an organic halogen compound and magnesium metal in the presence of a Lewis base of less than 1.5 mole per 1 gram atom of magnesium.

An object of the present invention is to provide an improved catalyst system suitable for the production of polyolefins. Another object of the invention is to provide a catalyst system which shows excellent activities not only per the transition metal compound but also per the solid catalyst and can give polyolefins having a high stereoregularity. A further object of the invention is to provide a catalyst component for the catalyst system. A still further object of the invention is to provide a process for homo- or copolymerization of olefins in the presence of the improved catalyst system. These and other objects and advantages of the invention will be apparent to the persons skilled in the art from the following description.

The catalyst system of the present invention comprises (A) at least one organometallic compound of a typical metal belonging to I, II or III group of Periodic table, (B) a reaction product of (i) a solid organomagnesium compound of the formula: $MgR_lX_{2-l}\cdot \alpha D$ wherein R is a hydrocarbon group having 1 to 20 carbon atoms, X is a halogen atom, D is a Lewis base, l is a number in the range of $0<l<2$ and $\alpha$ is a number in the range of $0 \leq \alpha < 1.5$, (ii) a phenol compound, (iii) a Lewis base, and (iv) a titanium compound and/or vanadium compound, and optionally, (C) a Lewis base in an amount of up to 1 mole to 1 mole of the component (A).

The organometallic compound of a typical metal (A) includes organo-lithium, -magnesium and -aluminum compounds of the formulae: $R^1Li$, $R^2MgX^1$ and $AlR^3{}_mX^2{}_{3-m}$ wherein $R^1$, $R^2$ and $R^3$ are each a hydrocarbon group having 1 to 20 carbon atoms, such as an alkyl group having 1 to 20 carbon atoms (e.g. methyl, ethyl, propyl, isopropyl, n-butyl, isobutyl, tert-butyl, n-amyl, isoamyl, hexyl, heptyl, octyl, 2-ethylhexyl), or an aryl group having 6 to 20 carbon atoms (e.g. phenyl, tolyl, xylyl, 2,4,6-trimethylphenyl, naphthyl, p-vinylphenyl), $X^1$ and $X^2$ are each hydrogen atom, a halogen atom (e.g. chlorine, bromine, iodine), or an alkoxy group having 1 to 20 carbon atoms (e.g. methoxy, ethoxy, propoxy, butoxy, ixobutoxy, amyloxy), and m is a number in the range of $0 < m \leq 3$. Suitable examples of the compound are n-butyllithium, n-butylmagnesium chloride, triethylaluminum, triisobutylaluminum, diethylaluminum chloride, dibutylaluminum chloride, diphenylaluminum chloride, ethylaluminum sesquichloride, diethylaluminum bromide, dibutylaluminum bromide, diethylaluminum iodide, dibutylaluminum iodide, diethylaluminum hydride, diethylalminum ethoxide, diethylaluminum methoxide, and mixture of these compounds. Among these compounds, trialkylaluminums of the formula: $AlR^4{}_3$ wherein $R^4$ is an alkyl group having 1 to 8 carbon atoms, such as triethylaluminum and triisobutylaluminum are preferred compounds. Particularly preferred examples of the component (A) are a mixture of the trialkylaluminum as mentioned above and a dialkylaluminum halide of the formula: $AlR^5{}_2X^3$ wherein $R^5$ is an alkyl group having 1 to 8 carbon atoms and $X^3$ is a halogen atom. Suitable mixing ratio of the trialkylaluminum and the dialkylaluminum halide is in the range of 1:4 to 4:1 by mole. Suitable examples of the mixture are an equimolar mixture of triethylaluminum and diethylaluminum chloride, an equimolar mixture of triisobutylaluminum and diethylaluminum chloride, and the like.

The solid organomagnesium compound (i) of the component (B) can be prepared by reacting an organic halogen compound and magnesium metal and optionally a small amount of a Lewis base (i.e. up to 1.5 mole, preferably 0.1 to 1.0 mole, perr 1 gram atom of magnesium) in the presence of a catalytic amount of iodine in an inert hydrocarbon solvent which does substantially not dissolve the organomagnesium compound. The molar ratio of the organic halogen compound to magnesium is not critical, but preferred molar ratio is in the range of 1.1:1.0 to 0.01:1.0 (the organic halogen compound:magnesium). When a halogenated hydrocarbon having 1 to 20 carbon atoms and magnesium are used, there is obtained an organomagnesium compound of the formula: $MgR_lX_{2-l}\cdot\alpha D$ wherein R is a hydrocarbon group having 1 to 20 carbon atoms, such as an alkyl group having 1 to 20 carbon atoms (e.g. methyl, ethyl, propyl, isopropyl, n-butyl, isobutyl, tert-butyl, n-amyl, isoamyl, hexyl, heptyl, octyl, 2-ethylhexyl), or an aryl group having 6 to 20 carbon atoms (e.g. phenyl, tolyl, xylyl, 2,4,6-trimethylphenyl, naphthyl, p-vinylphenyl), X is a halogen atom (e.g. chlorine, bromine, iodine), D is a Lewis base, l is a number in the range of $0 < l < 2$, preferably $0.005 \leq l \leq 1.90$, more preferably $0.01 \leq l \leq 1.50$, and $\alpha$ is a number in the range of $0 \leq \alpha < 1.5$, preferably $0 \leq \alpha \leq 1.0$. The organomagnesium compound is hereinafter referred to as "organomagnesium halide". Suitable examples of the organomagnesium halide are methyl-, ethyl-, butyl-, octyl-, or phenylmagnesium chloride, bromide or iodide, naphthylmagnesium chloride, p-tolylmagnesium chloride, 2,4,6-trimethylphenylmagnesium chloride, and the like.

The inert hydrocarbon solvent used in the preparation of the organomagnesium halides includes n-hexane, n-heptane, cyclohexane, benzene, toluene, or the like.

The Lewis base (D) includes ethers, ketones, carboxylic acid esters, phosphorus compounds, amines, sulfonic acid esters, and the like. Suitable examples of the Lewis base are diethyl ether, dibutyl ether, diisoamyl ether, anisole, diphenyl ether, tetrahydrofuran, dioxane, methyl ethyl ketone, acetophenone, diphenyl ketone, ethyl benzoate, ethyl p-anisate, ethyl p-toluylate, ethyl acetate, phenyl acetate, methyl stearate, di-2-ethylhexyl phthalate, di-n-octyl phthalate, dimethyl terephthalate, triphenyl phosphine, triphenyl phosphite, tri-n-butyl phosphite, triphenyl phosphate, hexamethyl phosphoric triamide, triethylamine, diphenylethylamine, phenyldioctylamine, methyl benzenesulfonate, ethyl benzenesulfonate, phenyl benzenesulfonate, methyl p-toluenesulfonate, ethyl p-toluenesulfonate, methyl p-methoxyenzenesulfonate, ethyl p-methoxybenzenesulfonate, methyl n-butylsulfonate, phenyl n-butylsulfonate, and the like. Among these compounds, ethers are preferred compounds.

The reaction of the halogenated hydrocarbon and magnesium is preferably carried out in the presence of a small amount of a Lewis base at a reaction temperature of 20° to 300° C., preferably 40° to 200° C., for 30 minutes to 20 hours, preferably for 3 to 10 hours. The inert hydrocarbon solvent is used in such an amount that magnesium is contained in the reaction system in the concentration of 0.01 to 0.1 g/ml.

The phenol compound (ii) includes also thiophenol compounds. Suitable examples of the phenol compounds are phenol, o-cresol, m-cresol, p-cresol, o-ethylphenol, m-ethylphenol, p-ethylphenol, o-butylphenol, m-butylphenol, p-butylphenol, 2,4,6-trimethylphenol, 2,6-dimethylphenol, 3,5-dimethylphenol, 2,6-di-tert-butyl-4-methylphenol, o-methoxyphenol, m-methoxyphenol, p-methoxyphenol, 2,4,5-trimethoxyphenol, 2,6-dimethoxyphenol, 3,5-dimethoxyphenol, $\alpha$-naphthol, $\beta$-naphthol, hydroquinone, catechol, thiophenol, p-thiocresol, and the like. Among them, the compounds having phenolic OH group are preferable. These phenol compounds may be used alone or in a combination of two or more compounds thereof. The phenol compound (ii) is used in an amount of 0.01 to 2 moles, preferably 0.5 to 1.5 mole to 1 gram atom of magnesium in the component (i).

The Lewis base (iii) may be the same as or different from the Lewis base used in the preparation of the organomagnesium compound powder and is selected from the Lewis bases as listed hereinbefore. The Lewis base (iii) is used in an amount of 0.01 to 10.0 moles, preferably 0.05 to 1.0 mole, per 1 gram atom of magnesium contained in the component (i).

The titanium compound and vanadium compound (iv) include preferably the compounds of the formulae: $Ti(OR^6)_pX^4_q$, $VO(OR^7)_rX^5_{3-r}$, and $V(OR^8)_sX^6_{4-s}$ wherein $R^6$, $R^7$ and $R^8$ are each a hydrocarbon group having 1 to 20 carbon atoms, such as an alkyl group having 1 to 20 carbon atoms (e.g. methyl, ethyl, propyl, isopropyl, n-butyl, isobutyl, tert-butyl, n-amyl, isoamyl, hexyl, heptyl, octyl, 2-ethylhexyl), or an aryl group having 6 to 20 carbon atoms (e.g. phenyl, tolyl, xylyl, 2,4,6-trimethylphenyl, naphthyl, p-vinylphenyl), $X^4$, $X^5$ and $X^6$ are each a halogen atom (e.g. chlorine, bromine, iodine), and p, q, r and s are a number in the range of $p+q = 3$ or $4$, $0 \leq p \leq 4$, $0 \leq q \leq 4$, $0 \leq r \leq 3$ and $0 \leq s \leq 4$, respectively. Suitable examples of these compounds are $TiCl_4$, $TiBr_4$, $TiI_4$, $TiCl_3Br$, $TiCl_2Br_2$, $TiCl_3I$, $Ti(OC_2H_5)_4$, $Ti(O-iso-C_3H_7)_4$, $Ti(O-iso-C_3H_7)_2Cl_2$, $TiCl_3$, $TiBr_3$, $TiI_3$, $VOCl_3$, $VO(O-iso-C_3H_7)_3$, $VCl_4$, $V(O-iso-C_3H_7)_4$, and the like. These compounds may be used alone or in a mixture thereof, such as a mixture of $TiCl_4$ and $VOCl_3$, $TiCl_4$ and $VCl_4$, $VOCl_3$ and $Ti(O-iso-C_3H_7)_4$, or the like. The compounds may also be in the form of a eutectic mixture with another compound, such as $TiCl_3 \cdot \frac{1}{3}AlCl_3$. Among these titanium compounds and vanadium compounds, liquid compounds containing a halogen are preferable. The titanium compound and vanadium compound (iv) are preferably used in an amount of 1 to 20 moles, more preferably 2 to 10 moles, per 1 gram atom of magnesium contained in the component (i).

These components (i), (ii), (iii) and (iv) are reacted simultaneously or in turn to give the solid catalyst component (B) containing titanium and/or vanadium which is suitable for the polymerization of olefins. Preferred reaction orders of these four components are as follows. It should be avoided to react firstly the component (i) and the component (iv) and then react thereto the component (ii).

(1) An organomagnesium halide fine powder (i) and a phenol compound (ii) are firstly reached in an inert hydrocarbon solvent, and the reaction product is reacted with a Lewis base (iii) and then reacted with a titanium compound and/or vanadium compound (iv).

(2) An organomagnesium halide fine powder (i), a phenol compound (ii) and a Lewis base (iii) are reacted simultaneously in a slurry state in an inert hydrocarbon solvent, and then the resulting reaction product is reacted with a titanium compound and/or vanadium compound (iv).

(3) An organomagnesium halide fine powder (i), a phenol compound (ii), a Lewis base (iii) and a titanium compound and/or vanadium compound (iv) are reacted simultaneously in a slurry state in an inert hydrocarbon solvent.

(4) A phenol compound (ii) and a titanium compound and/or vanadium compound (iv) are firstly reacted, and the reaction mixture is reacted with an organomagnesium halide fine powder (i) in a slurry state in an inert hydrocarbon solvent and then with a Lewis base (iii).

(5) An organomagnesium halide fine powder (i) and a phenol compound (ii) are reacted, and the reaction product is reacted with a reaction mixture of a Lewis base (iii) and a titanium compound and/or vanadium compound (iv) which are previously reacted.

All of the above reactions are usually carried out in a hydrocarbon solvent having 3 to 20 carbon atoms, such as pentane, hexane, heptane, cyclohexane, benzene, toluene, or the like. The reaction temperature is preferably in the range of $-20°$ to $300°$ C., more preferably $0°$ to $150°$ C. The reaction period of time is not critical, but is preferably in the range of 5 minutes to 20 hours, more preferably 30 minutes to 10 hours.

The solid reaction product obtained from the reaction of the components (i), (ii), (iii) and (iv) is isolated from the reaction system by a conventional method such as filtration, followed by washing with an inert hydrocarbon solvent as mentioned above and drying, and then is used for the polymerization reaction.

When the components (i), (ii), (iii) and (iv) are reacted successively in the above-mentioned reaction orders, the reaction product or mixture obtained in each step may be used in the next step after isolation (in the state of a solid product) from the reaction system by a conventional method such as filtration or may be used as it stands, i.e. without isolation.

The catalyst system of the present invention contains the component (A) and the component (B) in the ratio of 1-200 mole of the organometallic compound (A) per 1 gram atom of Ti or V contained in the component (B).

A Lewis base (C) may optionally be used in the preparation of the catalyst system of the present invention. The Lewis base (C) may be the same as or different from the Lewis base used in the preparation of the component (B) and is selected from the Lewis bases as listed hereinbefore. Among these Lewis bases, aromatic carboxylic acid esters such as ethyl benzoate, ethyl p-anisate, di-2-ethylhexyl phthalate, di-n-octyl phthalate, dimethyl terephthalate, or the like are preferable as the Lewis base (C). This component (C) is used in an amount of up to 1 mole, preferably up to 0.5 mole, per 1 mole of the organometallic compound (A).

Polymerization of olefins by using the catalyst system of the present invention is carried out under similar conditions to those of the polymerization reaction of olefins using a conventional Ziegler catalyst. That is, the reaction is carried out under the condition substantially free from oxygen and water in a gaseous phase or in the form of a suspension or solution in an appropriate inert solvent or liquid monomers. The solvent or dispersing agent used in the polymerization reaction includes inert hydrocarbons having 3 to 20 carbon atoms, such as pentane, hexane, heptane, cyclohexane, benzene, toluene or the like. The polymerization reaction of olefins is usually carried out at a polymerization temperature of $20°$ to $300°$ C., preferably $50°$ to $200°$ C., under a pressure of from atmospheric pressure to 100 $kg/cm^2$, preferably 2 to 60 $kg/cm^2$. Molecular weight of the obtained polyolefins may somewhat be controlled by varying the polymerization conditions such as polymerization temperature, ratio of the catalyst components, or the like, but is effectively controlled by adding hydrogen to the polymerization reaction system.

The polymerization process of the present invention can be applied to polymerization of all olefins, to which the conventional Ziegler catalyst is applicable. For instance, the process of the present invention is preferably used for the homopolymerization of α-olefins such as ethylene, propylene, 1-butene, or the like, and for the copolymerization of a combination of α-olefins such as ethylene and propylene; ethylene and 1-butene; propylene and 1-butene; propylene, ethylene and 1-butene; or the like.

The present invention is illustrated by the following Examples but is not limited thereto.

EXAMPLE 1

(1) Preparation of n-butylmagnesium chloride

In a four-necked flask substituted with nitrogen, dry magnesium turnings (22.4 g) and n-butyl chloride (114.4 ml) are reacted in n-heptane (500 ml) in the presence of iodine (0.02 g) at 90° C. for 7 hours to produce white powdery reaction product. After the reaction, the unreacted magnesium is removed from the reaction suspension. The powdery n-butylmagnesium chloride thus obtained is separated from the solvent by filtration and dried under reduced pressure. As a result of analysis of the product, the n-butylmagnesium chloride contains 23.0% by weight of Mg and 58.5% by weight of Cl.

(2) Preparation of catalyst component (B)

To a slurry of the white powdery product obtained in the above (1) (5.4 g) in n-heptane (50 ml) is added a solution of phenol (3.2 g) in n-heptane (50 ml), and the mixture is reacted at about 25° C. for 1 hour. After the reaction is finished, the solvent is removed by filtration, and to the remaining reaction mixture is added a mixture of diethyl ether (4.3 ml) and n-heptane (100 ml). The mixture is further reacted at about 25° C. for 1 hour. The resulting reaction product is removed from the mixture by filtration, and thereto is added $TiCl_4$ (21.0 ml) under cooling at 0° C., and the mixture is reacted at 136° C. for 2 hours. After the reaction, the resulting slurry is cooled to about 25° C. The reaction product thus obtained is washed with h-heptane until no free $TiCl_4$ is detected in the washing n-heptane and then dried under reduced pressure. The catalyst product thus obtained is in the form of a light reddish brown powder and contains Ti, Mg and Cl of 2.4, 21.0 and 66.0% by weight, respectively.

(3) Polymerization A

Into a 100 ml stainless steel autoclave substituted with nitrogen are charged triethylaluminum (3 mmole), diethylaluminum chloride (3 mmole), ethyl p-anisate (2 mmole) and the solid catalyst component (23.5 mg) obtained in the above (2) in turn, and thereto is further charged liquid propylene (80 ml), and the mixture is subjected to polymerization at 60° C. for 1 hour while stirring with a magnetic stirrer.

After the polymerization reaction, the unreacted propylene is discharged from the autoclave to give a white powdery polypropylene (27.3 g). The catalytic activity R(Y), i.e. a polymer yield, per 1 g of the catalyst component (B) is 1,160 g-pp/g-catalyst, and the catalytic activity R(Ti), i.e. a polymer yield, per 1 g of Ti contained in the catalyst component (B) is 48,400 g-pp/g-Ti. Thus, the catalyst obtained activity. Besides, when the polypropylene thus obtained is extracted with boiling n-heptane for 6 hours, the remaining extraction residue (hereinafter, referred to as "II") is 88% by weight.

(4) Polymerization B

Into a 2.0 liter stainless steel autoclave substituted with propylene are charged triethylaluminum (4 mmole), diethylalminum chloride (4 mmole) ethyl p-anisate (2 mmole) and sufficiently dehydrated pure n-heptane (600 ml) and thereto is further charged the solid catalyst component (43.8 mg) obtained in the above (2). To the autoclave is added hydrogen (240 ml at normal state) under pressure, and the inner temperature of the autoclave is raised up to 60° C., and thereafter propylene is polymerized at 70° C. for 2 hours while keeping the inner pressure of the autoclave at 10 kg/cm$^2$.G by adding propylene. After the polymerization, the polymerization reaction is stopped by adding n-butanol (3 ml) to the reaction system, and the unreacted propylene is discharged from the autoclave, and the resulting polymer slurry is diluted with n-heptane which is warmed at 60° C. The powdery polymer thus obtained is separated from the slurry with a centrifugal separator and dried at 50° C. under reduced pressure to give a powdery polymer (165.7 g) having a bulk density of 0.37 g/ml, and II of 95.5% by weight. By distilling off the solvent from the remaining solution, there is obtained polypropylene (14.7 g) which is soluble in n-heptane. Thus, the catalyst shows a catalytic activity R(Y) of 4,120 g-pp/g-catalyst and R(Ti) of 172,000 g-pp/g-Ti, and the yield of the powdery polymer (hereinafter, referred to as "HIP") is 91.9%.

EXAMPLE 2

(1) Preparation of n-butylmagnesium chloride

Dry magnesium turnings (12.2 g) and n-butyl chloride (67 ml) are reacted in a mixed solvent of n-heptane (300 ml) and diethyl ether (20 ml) in the presence of iodine (0.01 g) at 50°–60° C. for 4 hours. After the reaction, unreacted magnesium is removed. The white powdery product is separated by filtration and dried under reduced pressure. As a result of analysis of the product, the fine powdery n-butylmagnesium chloride contains 18.1% by weight of Mg, 33.6% by weight of Cl and 3.1% by weight of diethyl ether.

(2) Preparation of the catalyst component (B)

The powdery n-butylmagnesium chloride (15.6 g) obtained in the above Example 2, (1) is suspended into n-heptane (100 ml) and thereto is added dropwise a solution of phenol (8.78 g) in n-heptane (211 ml), and the mixture is reacted at about 25° C. for 1 hour. After the reaction is finished, the liquid layer is discharged from the system by filtration, and to the residue is added a mixture of diethyl ether (12.4 ml), ethyl benzoate (1.87 ml) and n-heptane (300 ml), and the mixture is further reacted at about 25° C. for 1 hour. After the reaction, the reaction product is taken out from the system by filtration, and thereto is added TiCl$_4$ (65 ml) at about 0° C., and the mixture is gradually heated up to 136° C. and then reacted at 136° C. for 2 hours. After the reaction, the resulting slurry is cooled to about 25° C., and the reaction product is washed with n-heptane until no free TiCl$_4$ is detected in the washing n-heptane and dried under reduced pressure. The catalyst thus obtained is in the form of powder having a red-brick color. As a result of analysis of the product, it contains 4.0% by weight of Ti, 17.2% by weight of Mg, 59.2% by weight of Cl, 0.3% by weight of diethyl ether, and 4.8% by weight of ethyl benzoate.

(3) Polymerization

In the same manner as described in Example 1, (4): polymerization B, the polymerization is carried out by using the catalyst component B (51.4 mg) obtained in the above Example 2, (2) for 1 hour. As a result, there are obtained a powdery polymer (343.1 g) and n-heptane-soluble polymer (8.9 g). Thus, the catalyst shows a catalytic activity R(Y) of 6,850 g-pp/g-catalyst, R(Ti) of 171,000 g-pp/g-Ti, and HIP of 97.5%. The powdery polymer thus obtained has a bulk density of 0.37 g/ml, an intrinsic viscosity [$\eta$] of 1.69 dl/g, a melt index of 7.4 g/minute, and a stiffness of 12,400 kg/cm$^2$.

EXAMPLE 3

(1) Preparation of the catalyst component B

Powdery n-butylmagnesium chloride (3.7 g) obtained in the above Example 2, (1) is added to a solution of phenol (2.1 g) and ethyl benzoate (0.44 ml) in n-heptane (73 ml), and the mixture is reacted under reflux of n-heptane for 1 hour. After removal of the solvent by filtration, TiCl$_4$ (15 ml) is added to the residue, and the mixture is reacted at 136° C. for 2 hours. The resulting reaction slurry is cooled to about 25° C. and the reaction product is washed with n-heptane until no free TiCl$_4$ is detected in the washing n-heptane. After the washing, the reaction product is dried under reduced pressure to give a powdery catalyst having a reddish brown color. The catalyst thus obtained contains 3.5% by weight of Ti, 19.3% by weight of Mg, 60.6% by weight of Cl, 0.1% by weight of diethyl ether, and 3.7% by weight of ethyl benzoate.

(2) Polymerization

In the same manner as described in Example 1, (4), the polymerization is carried out by using the catalyst component B (49.5 mg) obtained in Example 3, (1) for 1 hour. As a result, there are obtained a powdery polymer (336.6 g) and n-heptane-soluble polymer (11.3 g). Thus, the catalyst shows a catalytic activity R(Y) of 7,030 g-pp/g-catalyst, R(Ti) of 200,000 g-pp/g-Ti, and HIP of 96.8%. The powdery polymer has a bulk density of 0.37 g/ml, and a melt index of 7.8 g/10 minute.

EXAMPLES 4 to 7

Example 3, (1) is repeated except that various aromatic alcohols as shown in the following Table 1 are used in an amount of 0.81 mole per 1 gram atom of magnesium contained in n-butylmagnesium chloride instead of phenol, there are obtained the catalyst components B. The catalyst components B are used for the polymerization of propylene in the same manner as described in Example 1, (4). The results are shown in Table 1.

REFERENCE EXAMPLES 1 TO 4

Example 3, (1) is repeated except that three aliphatic alcohols as shown in Table 1 are used in amount of 0.81 mole per 1 gram atom of magnesium contained in n-butylmagnesium chloride instead of phenol or no alcohol is used, there are obtained the catalyst components B. The catalyst components B are used for the polymerization of propylene in the same manner as described in Example 1, (4). The results are shown in Table 1.

As is clear from the comparison of the data in Reference Examples 1 to 4 and the data in Examples 1 to 7, use of phenol compounds is very useful for the preparation of the desired catalyst component B.

TABLE 1

| Example No. | Alcohols | Ti (% by weight) | R(Y) (g-pp/ g-cat.) | R(Ti) (g-pp/ g-cat.) | HIP (%) |
| --- | --- | --- | --- | --- | --- |
| Example 4 | p-Cresol | 3.4 | 8,900 | 262,000 | 95.3 |
| Example 5 | o-Cresol | 2.5 | 4,600 | 184,000 | 96.0 |
| Example 6 | α-Naphthol | 2.0 | 5,900 | 295,000 | 97.1 |
| Example 7 | Hydroquinone monomethyl ether | 2.2 | 4,300 | 195,000 | 95.6 |
| Reference Example 1 | Isoamyl alcohol | 8.6 | 5,200 | 63,400 | 94.0 |

TABLE 1-continued

| Example No. | Alcohols | Ti (% by weight) | R(Y) (g-pp/ g-cat.) | R(Ti) (g-pp/ g-cat.) | HIP (%) |
|---|---|---|---|---|---|
| Reference Example 2 | Cyclohexyl alcohol | 18.2 | 4,100 | 22,500 | 92.2 |
| Reference Example 3 | l-Menthol | 20.0 | 3,000 | 15,000 | 93.5 |
| Reference Example 4 | None | 22.1 | 2,900 | 13,100 | 90.3 |

EXAMPLE 8

(1) Preparation of the catalyst component B

Powdery n-butylmagnesium chloride (5.4 g) obtained in Example 2, (1) is added to a solution of phenol (2.5 g) and ethyl benzenesulfonate (0.15 ml) in n-heptane (85 ml), and the mixture is reacted under reflux of n-heptane for 1 hour. After removal of the solvent by filtration, $VOCl_3$ (20 ml) is added to the residue, and the mixture is reacted at 100° C. for 2 hours. The resulting reaction slurry is cooled to about 25° C., and the reaction product is washed with n-heptane until no free $VOCl_3$ is detected in the washing n-heptane. After the washing, the reaction product is dried under reduced pressure to give a powdery catalyst. The catalyst thus obtained contains 6.7% by weight of V, 17.8% by weight of Mg, and 62.1% by weight of Cl.

(2) Polymerization

Into a 2.0 liter stainless steel autoclave substituted with ethylene are charged triethylamluminum (8 mmole) and n-heptane (600 ml) and thereto is added the solid catalyst (20.3 mg) obtained in the above (1). Hydrogen is added to the autoclave until the inner pressure of the autoclave becomes 1.0 kg/cm².G, and then the mixture is heated until the inner temperature of the autoclave becomes 65° C. After starting addition of ethylene, the mixture is polymerized at 70° C. under 2.0 kg/cm².G for 4 hours. After the polymerization, the unreacted ethylene is discharged from the autoclave, and the resulting polyethylene is separated from the polymer slurry and dried to give a powdery polymer (122.5 g) having a bulk density of 0.37 g/ml. The catalyst shows a catalytic activity R(Y) of 6,030 g-pe/g-catalyst.

What is claimed is:

1. A catalyst component for a catalyst system useful for the polymerization of olefins, which comprises a reaction product of (i) a solid organomagnesium compound which is a reaction product of Mg, R—Cl and D in a hydrocarbon solvent, wherein R is an alkyl group having 1 to 20 carbon atoms, D is an ether, and the amount of D is 0.1 to 1.0 mole per 1 gram atom of magnesium, (ii) a phenol compound, (iii) a Lewis base selected from the group consisting of an ether and a carboxylic acid ester, and (iv) titanium tetrahalide, wherein the phenol compound (ii), the Lewis base (iii) and the titanium tetrahalide (iv) are used in an amount of 0.5 to 1.5 moles, 0.05 to 1.0 moles and 2 to 10 moles, respectively, per 1 gram atom of magnesium contained in the organomagnesium compound (i).

2. A catalyst component according to claim 1, wherein R of the organomagnesium compound (i) is a member selected from the group consisting of methyl, ethyl, butyl and octyl.

3. A catalyst component according to claim 1, wherein the phenol compound (ii) is a member selected from the group consisting of phenol, o-cresol, m-cresol, p-cresol, o-ethylphenol, m-ethylphenol, p-ethylphenol, o-butylphenol, m-butylphenol, p-butylphenol, 2,4,6-trimethylphenol, 2,6-dimethylphenol, 3,5-dimethylphenol, 2,6-di-tert-butyl-4-methylphenol, o-methoxyphenol, m-methoxyphenyl, p-methoxyphenol, 2,4,6-trimethoxyphenol, 2,6-dimethoxyphenol, 3,5-dimethoxyphenol, α-naphthol, β-naphthol, hydroquinone, catechol, thiophenol and p-thiocresol.

4. A catalyst system useful for the polymerization of propylene and the copolymerization of propylene and ethylene, which comprises:

(A) an organoaluminum compound, (B) a reaction product of (i) a solid organomagnesium compound which is a reaction product of Mg, R—Cl and D in a hydrocarbon solvent, wherein R is an alkyl group having 1 to 20 carbon atoms, D is an ether, and the amount of D is 0.1 to 1.0 mole per 1 gram atom of magnesium, (ii) a phenol compound, (iii) a Lewis base selected from the group consisting of an ether and a carboxylic acid ester, and (iv) titanium tetrahalide, wherein the phenol compound (ii), the Lewis base (iii) and the titanium tetrahalide (iv) are used in an amount of 0.5 to 1.5 moles, 0.05 to 1.0 moles and 2 to 10 moles, respectively, per 1 gram atom of magnesium contained in the organomagnesium compound (i), and (C) a Lewis base in an amount of up to 1 mole to 1 mole of the component (A).

5. A catalyst system according to claim 4, wherein the organoaluminum compound (A) is a compound of the formula: $AlR^3{}_m X^2{}_{3-m}$, wherein $R^3$ is a hydrocarbon group having 1 to 20 carbon atoms, $X^2$ is a hydrogen atom, a halogen atom or an alkoxy group having 1 to 20 carbon atoms, and m is a number in the range of $0 < m \leq 3$.

6. A catalyst system according to claim 4, wherein the organoaluminum compound (A) is a member selected from the group consisting of triethylaluminum, triisobutylaluminum, diethylaluminum chloride, dibutylaluminum chloride, diphenylaluminum chloride, ethylaluminum sesquichloride, diethylaluminum bromide, dibutylaluminum bromide, diethylaluminum iodide, dibutylaluminum iodide, diethylaluminum hydride, diethylaluminum ethoxide, and diethylaluminum methoxide.

7. A catalyst system according to claim 4, wherein the organoaluminum compound (A) is a member selected from the group consisting of a trialkylaluminum of the formula: $AlR^4{}_3$ where $R^4$ is an alkyl group having 1 to 8 carbon atoms and a mixture of trialkylaluminum of the formula: $AlR^4{}_3$ wherein $R^4$ is an alkyl group having 1 to 8 carbon atoms and a dialkylaluminum halide of the formula: $AlR^5{}_2 X^3$ wherein $R^5$ is an alkyl group having 1 to 8 carbon atoms and $X^3$ is a halogen atom.

8. A process for the production of propylene polymers having high stereoregularity which comprises homoplymerizing propylene or dicopolymerizing propylene and ethylene in the presence of the catalyst system as set forth in any one of claims 4, 5, 6 or 7.

* * * * *